C. SZAFRANSKI.
VALVE LOCK.
APPLICATION FILED MAY 12, 1921.
1,412,720.
Patented Apr. 11, 1922.
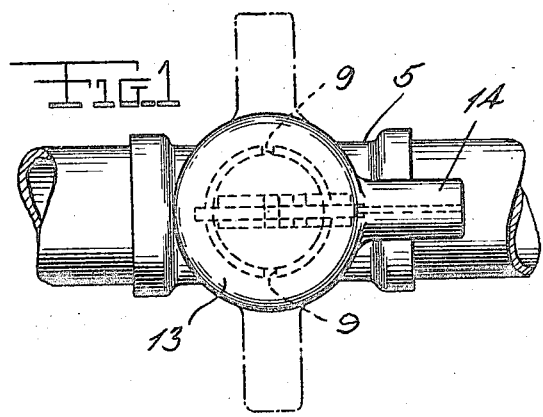
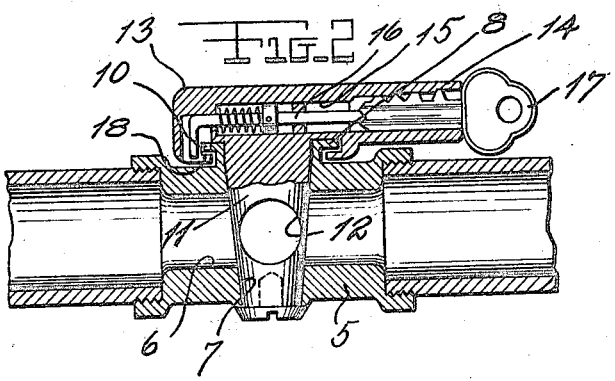
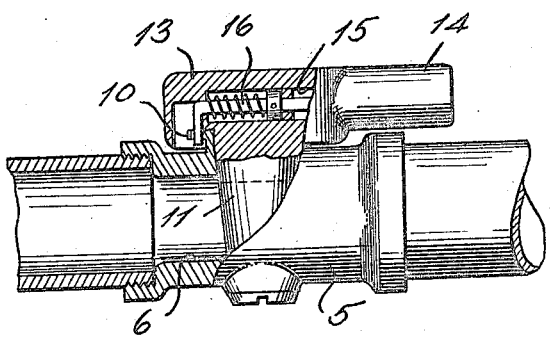

UNITED STATES PATENT OFFICE.

CASEY SZAFRANSKI, OF SOUTH CHICAGO, ILLINOIS.

VALVE LOCK.

1,412,720.  Specification of Letters Patent.  Patented Apr. 11, 1922.

Application filed May 12, 1921. Serial No. 469,041.

*To all whom it may concern:*

Be it known that I, CASEY SZAFRANSKI, a citizen of the United States, residing at South Chicago, in the county of Cook and State of Illinois, have invented certain new and useful Improvements in Valve Locks, of which the following is a specification.

This invention relates to improvements in valves and has for its principal object to provide a fluid control valve having a locking means associated therewith for holding the valve in either open or closed position.

Another object of the invention is to provide a device which is simple in construction and may be easily and cheaply made.

With these and other objects in view the invention consists in the novel construction, combination and arrangement of parts which will be fully set forth in the following specification, claimed and illustrated in the accompanying drawing, in which, Figure 1 is a top plan view of this improved locking valve, Figure 2 is a longitudinal sectional view through the device showing the key inserted to release the turning plug, the valve being shown in closed position, and Figure 3 is a side view of the valve showing a portion thereof in section and illustrating the key withdrawn.

Referring to the drawings in detail the numeral 5 designates the valve body having a longitudinal bore 6 extending therethrough. Said body is also provided with a transverse tapered bore 7 forming the seat into which the turning plug is fitted. An outwardly extending collar is formed on the valve body and its inner circumference lies flush with the wall of the bore 7 as clearly shown in the drawings. An outstanding annular flange 8 is formed at outer end of the collar and is provided with notches 9 and 10 for the reception of the turning plug, locking dog, which will be more fully hereinafter described.

Fitted into the tapered bore 7 is a turning plug 11 formed with a transverse opening 12 which is adapted to aline with the bore 6 when the valve is open to permit the free passage of fluid through said valve. Formed integrally with the turning plug at its larger end is a head 13 provided with a hollow radial extension 14 the inner walls of which are provided with suitable wards to prevent the insertion of a spurious key. A cylindrical chamber 15 is formed in the head 13 in alinement with the hollow extension 14 and slidable in said chamber 15 is a spring pressed plunger 16, one end of which is yieldably held in position to be engaged by the end of a key 17 when the same is inserted into the hollow extension 14. The opposite end of the plunger is bent at right angles to provide a locking dog which is normally held by the action of the spring in one of the notches 9 or 10, depending on whether the valve is open or closed. A retaining flange 18 is formed on the head for engagement beneath the flange 8, whereby the turning plug will be held in place in the bore 7.

In use it will be seen that when the proper key is entered into the hollow extension 14 its inner end may be pressed against the end of the plunger 16, thus forcing the same inwardly against the action of the spring and causing the locking dog to move outwardly and permit the turning plug and associated parts to freely turn. Assuming that the valve has been in closed position so that the dog has been engaged in one of the notches 9 it will be seen that upon inserting the proper key it may be moved out of the notch and when the plug has been turned at right angles, the dog will be in position to enter notch 10 and lock the valve in open position, upon withdrawal of the key.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

A valve comprising, a body having a longitudinal passage therethrough, and a transverse tapered bore intermediate its ends, an apertured turning plug fitted in the tapered bore, a head on the larger end of said plug, said head having a transverse cylindrical chamber therein, a single plunger in the chamber, a hollow lateral extension on the head arranged in alinement with the chamber to receive a key and acting as a handle, a notched flange on the valve body wholly covered by the head, and a dog on one end of the plunger for engagement in the notches in the flange, said plunger and dog being slidable upon forcible contact with an entered key, a collar adjustably fixed on said plunger, and a compression spring encircling said plunger abutting said collar and the wall of the chamber, said spring being adapted to retain said dog in one of the notches of said flange.

In witness whereof I affix my signature.

CASEY SZAFRANSKI.